June 12, 1962 J. W. GLASS 3,039,070
FAN MOTOR CONTROL
Filed July 28, 1960

INVENTOR.
JAMES W. GLASS
BY *W.B. Harpman*
ATTORNEY

United States Patent Office 3,039,070
Patented June 12, 1962

3,039,070
FAN MOTOR CONTROL
James W. Glass, New Castle, Pa., assignor to Glass, Scott & Wilcox, Incorporated, Pittsburgh, Pa., a corporation of Pennsylvania
Filed July 28, 1960, Ser. No. 45,970
5 Claims. (Cl. 338—31)

This invention relates generally to a heating and air conditioning device and more particularly to a fan motor control for such a device.

The principal object of the invention is the provision of a fan motor control for an air conditioning device incorporating a rheostat whereby the speed of the fan motor may be varied relative to the temperature of the air in the air conditioning device.

A further object of the invention is the provision of a simple and efficient fan motor control for an air conditioning device that will operate efficiently in varying the speed of the fan motor when said device is heating and when said device is cooling the air passing therethrough.

A further object of the invention is the provision of a fan motor control for an air conditioning device arranged to vary the electrical current supplied the fan motor when the air temperature in the air conditioning device varies from a desired normal temperature.

A further object of the invention is the provision of a fan motor control for an air conditioning device wherein the fan motor operates continuously and the speed of the fan motor is varied responsive to changes in the air temperature in the air conditioning device.

The fan motor control for an air conditioning device disclosed herein incorporates a rheostat connected in the circcit of the fan motor, which motor is of the shaded pole, D.C. or Universal type and therefore capable of operating continuously at various speeds dependent upon the voltage supplied the same. The fan motor control for an air conditioning device, such as a furnace, operates to supply the fan motor with maximum voltage for maximum speed at a desired temperature, for example, 70°, and the fan motor control is so arranged that it decreases the voltage supplied the fan motor when the air temperature rises above the desired temperature or falls below the desired temperature. The fan motor control is adjustable so that the desired temperature may be preset and its construction makes it equally efficient in varying the fan speed in either a heating or cooling operation. The fan motor control is relatively compact and is easily installed in the plenum of an air conditioning unit or in the principal duct thereof and is responsive in operation to variation of the air temperature in the plenum or duct.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 3:
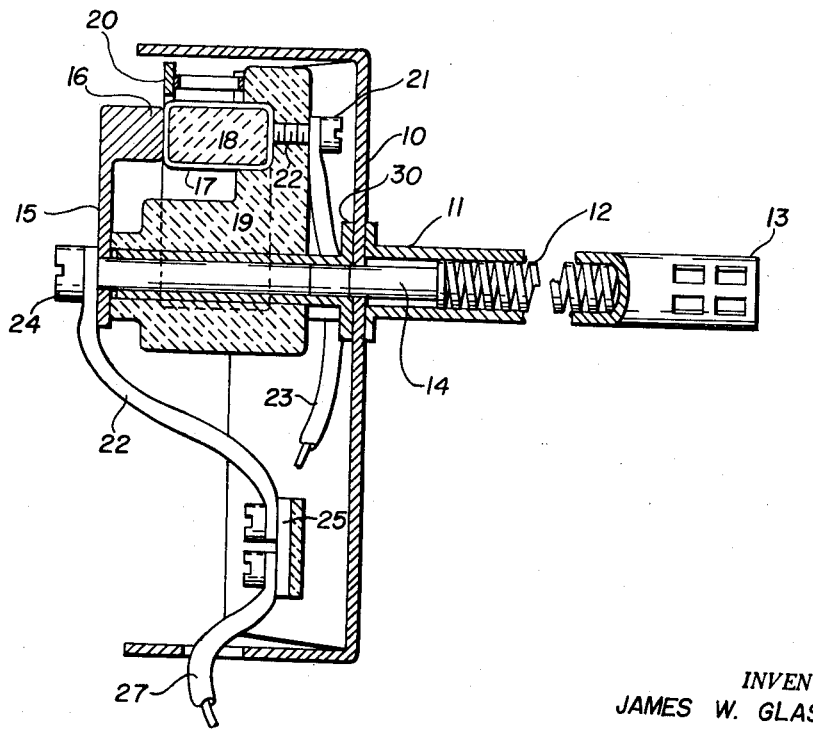
FIGURE 3 is an enlarged vertical section on line 3—3 of FIGURE 1.

By referring to the drawings and FIGURE 3 in particular, it will be seen that the fan motor control comprises a portion 10 of a housing which may be mounted on the plenum of an air conditioning device or on a main duct thereof as will be understood by those skilled in the art. An apertured tubular member 11 is connected at one end to the portion 10 of the housing and extends outwardly therefrom and into the plenum or duct on which the fan motor control is installed. A bimetallic element in the form of a helix 12 is positioned movably within the tubular member 11 and has its outermost end secured to the outermost end 13 of the tubular member 11. The innermost end of the helix 12; that is, the end lying close to the portion 10 of the housing of the device, is attached to a shaft 14 which is rotatably mounted in the device and adapted to be moved in a partial rotating motion by the bimetallic helix 12 as will also be understood by those skilled in the art. The shaft 14 extends through an aperture in the portion 10 of the housing and into the area defined thereby and carries a conductor arm 15 adjacent the outermost end thereof which conductor arm extends vertically from the shaft 14 as seen in FIGURES 1 and 3 and has a contact area 16 on its outermost inturned end.

A rheostat coil 17 is mounted on a non-conductive core 18 which is formed in an arcuate shape comprising 180°. The coil 17 and the core 18 are mounted on a non-conductive body member 19 which is rotatably positioned on a tube 30 in which the shaft 14 heretofore referred to is positioned. An indicia carrying arcuate shaped dial 20 is also mounted on the body member 19 as best seen in FIGURES 1 and 2 of the drawings. The indicia carrying dial 20 is mounted in spaced relation to the rheostat coil 17. A terminal 21 is mounted on the body member 19 and an electrical conducotr 22 extends between the terminal 21 and the center point of the rheostat coil 17 so that in the position illustrated in FIGURES 1 and 3, maximum voltage will flow between the contact area 16 on the conductor arm 15 through the center section of the rheostat coil 17 and the terminal 21. Flexible electrical conductors 22 and 23 extend from a secondary terminal 24 on the conductor arm 15 from the terminal 21 to other terminals 25, 25 and 26, 26 mounted on a portion of the housing. The other terminals 25, 25 and 26, 26 are connected to the ends of a circuit wire 27 comprising part of a circuit (not shown) supplying a fan motor as will be understood by those skilled in the art.

Figures 1, 2:
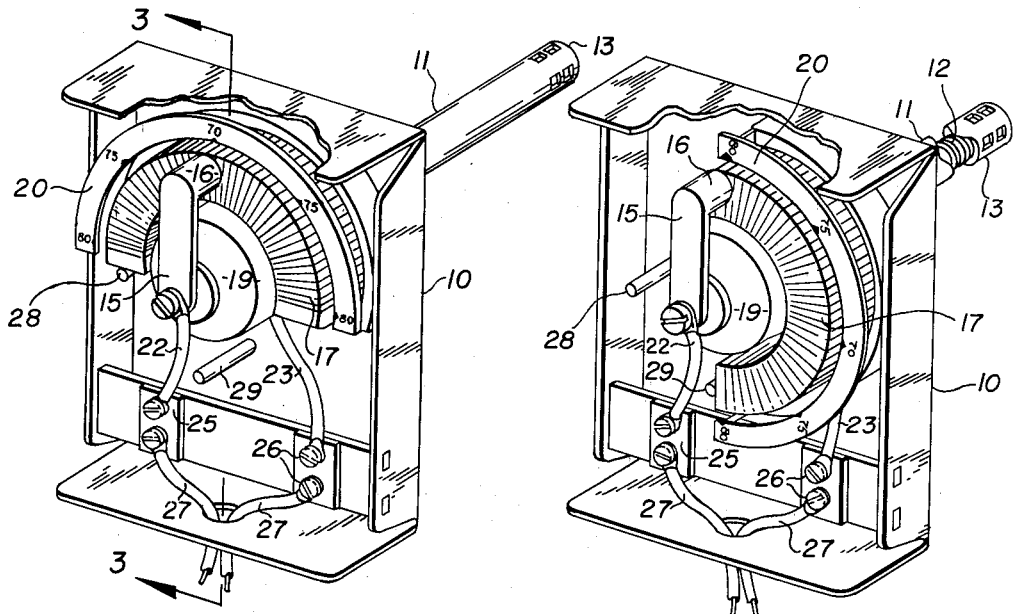
FIGURE 1 is a perspective view of the fan control showing the parts of the fan motor control in position for maximum fan speed operation in a heating cycle.
FIGURE 2 is a perspective view of the fan control showing the fan motor control arranged for minimum fan speed in a cooling operation.

By referring now to FIGURE 1 of the drawings, it will be observed that the contact 16 on the conductor arm 15 is shown engaging the rheostat coil 17 in the center thereof and directly opposite the conductor 22 so that maximum voltage in the wire 27 will flow through the flexible conductor 22, the arm 15, across the coil 17, through the contact 22 and the flexible conductor 23 thereby enabling the electric fan motor controlled by the device to operate at maximum speed. As illustrated, the rheostat coil 17 on its arcuate core 18 and the body member 19 are set so that air temperature of 70° will position the bimetallic helix 12 and the arm 15 as illustrated in FIGURES 1 and 3 of the drawing, and thus cause the fan motor control to deliver maximum voltage.

When the air temperature about the bimetallic helix 12 rises above normal as upon the prolonged operation of a heating device, the bimetallic helix 12 rotates the shaft 14 clockwise as seen in FIGURE 1 and thereby moves the conductor arm 15 and its contact 16 to the right as seen in FIGURE 1 whereupon the contact area 16 on the conductor arm 15 engages a portion of the rheostat coil 17 spaced with respect to the conductor 22 which engages the middle portion thereof as heretofore described and the resistance of the rheostat coil 17 reduces the voltage transmitted and the fan motor accordingly is slowed down. Thus, the rising air temperatures occasion a reduction in the volume of the air delivered with the result that the room temperature being controlled by a thermostat (not shown) rises only slightly as the reduced volume of air of higher temperature does not overheat the room and override the thermostat.

At such time as the thermostat is satisfied and the burner or other heat source operation discontinued, the air temperature about the bimetallic helix 12 will fall causing the same to move the conductor arm 15 and its contact 16 counterclockwise back toward the center point of the rheostat coil 17 and thereby increases the voltage delivered to the fan motor and the fan motor accordingly speeds up as the preset normal air temperature is achieved.

As the air temperature continues to cool the conductor arm 15 and its contact 16 will continue to move counterclockwise relative to the rheostat coil 17 and thereby reduce the voltage supplied the fan motor and cause the same to slow down. This action continues until such time as the minimum fan speed is reached or the thermostat in the room area again operates the heat source whereupon increased air temperatures cause the bimetallic helix 12 to again move the conductor arm 15 and its contact area 16 clockwise back toward the preset normal temperature.

It will be observed that the portion 10 of the housing carries stops comprising a pair of spaced projecting pins 28 and 29 positioned in spaced relation to the axis of the shaft 14 and in position where they will be engaged by the ends of the core 18 of the rheostat coil 17.

It will be observed by referring to FIGURE 3 of the drawings, that the tube 30 is secured at one end to the portion 10 of the housing and extends into the area defined thereby so that it does not interfere with motion imparted the shaft 15 by the bimetallic helix 12 while at the same time it provides for the rotatable mounting of the body member 19 on the axis of the shaft 14.

It will thus be seen that the fan control disclosed herein is intended to be used in an air conditioning system wherein the air circulating fan operates continuously with the fan motor control varying the speed of the fan motor relative to the air temperature in the system so that a desired room temperature may be very closely maintained. It will occur to those skilled in the art that the device will operate equally efficiently on a cooling or heating cycle in an air conditioning apparatus and that in either event, the maximum fan speed is obtained only at the time when the preset normal or optimum air temperature is reached.

By referring to FIGURE 2 of the drawings, it will be seen that the rheostat coil 17 on its core 18 and the body member 19 have been partially rotated relative to the device so that one end of the coil 17 is positioned beneath the contact area 16 of the conductor arm 15, in such position minimum voltage is supplied the fan motor and the same therefore operates at minimum speed.

For example, in a cooling cycle, the air circulation is desirably slowed down at the preset normal or desired temperature and that the device operates to increase the fan motor speed when the air temperature rises and again reduces fan motor speed when the air temperature falls.

It will thus be seen that a fan motor control has been disclosed which meets the several objects of the invention, and having thus described my invention, what I claim is:

1. A fan control comprising a rotatable shaft, a contact arm on said shaft and a bimetallic helix arranged to partially rotate said shaft responsive to changes in air temperature, a rheostat coil having a center feed tap and in the form of an arc positioned in spaced relation to said shaft and engaged by said contact arm and an electric conductor extending from said contact arm and a secondary electric conductor extending from said center feed tap on said rheostat coil, said electric conductors comprising part of a circuit controlling said fan motor and means mounting said rheostat coil for movement in a circular path centered on said shaft.

2. The fan motor control set forth in claim 1 and wherein sole means mounting said rheostat coil comprises a body member, a tubular support positioned about said shaft and supporting said body member.

3. The fan motor control set forth in claim 1 and wherein said control includes a housing and a secondary tubular member extending from said housing positioned about said bimetallic helix and wherein one end of said bimetallic helix is secured to said secondary tubular member.

4. A fan motor control comprising a housing having an apertured tubular member extending therefrom, a bimetallic helix positioned in said tubular member and having one end secured thereto, a shaft, a contact arm on said end of said shaft and said bimetallic helix connected to the other end of said shaft for imparting rotating motion thereto responsive to air temperature changes, a rheostat coil of arcuate shape positioned adjacent said contact arm for continuous engagement thereby when said shaft moves, a center feed tap on said rheostat coil and an electric circuit comprising a first conductor connected to said contact arm and a second conductor connected to said center feed tap, said electric circuit comprising part of a circuit controlling said fan motor.

5. The fan motor control set forth in claim 4 and wherein said rheostat coil comprises a winding of resistance wire on a core, a body member mounted on said housing for movement in a circular path centered on said shaft and carrying said core.

References Cited in the file of this patent
UNITED STATES PATENTS

| | | |
|---|---|---|
| 2,244,348 | Rickmeyer | June 3, 1941 |
| 2,573,041 | May | Oct. 30, 1951 |
| 2,894,236 | Jopson | July 7, 1959 |